Sept. 28, 1965  W. C. RUDD  3,209,116
LONGITUDINALLY WELDING THE END PORTIONS OF TUBULAR MEMBERS
Filed April 18, 1963  2 Sheets-Sheet 1

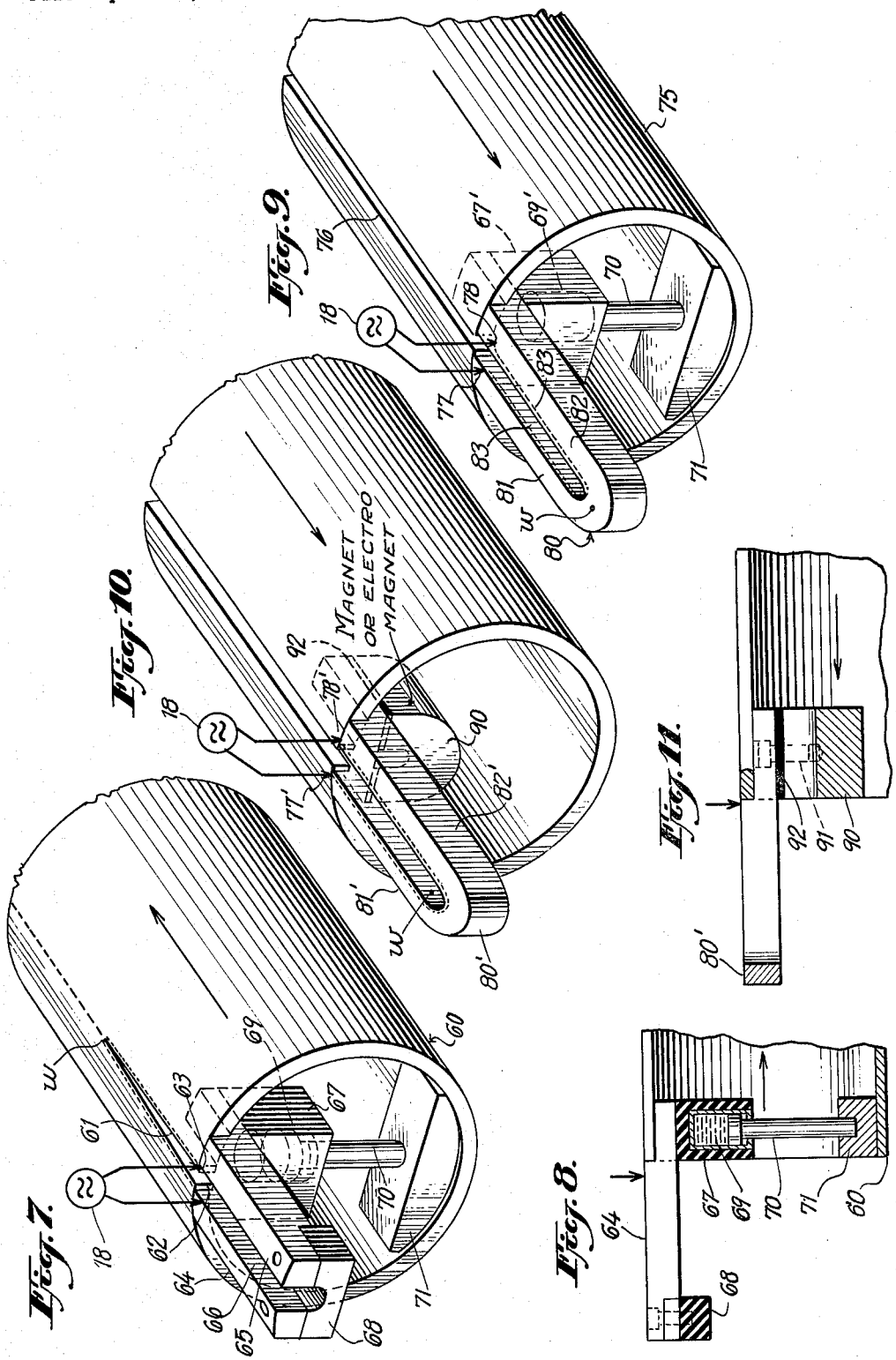

United States Patent Office 3,209,116
Patented Sept. 28, 1965

3,209,116
LONGITUDINALLY WELDING THE END
PORTIONS OF TUBULAR MEMBERS
Wallace C. Rudd, Larchmont, N.Y., assignor to American
Machine & Foundry Company, New York, N.Y., a
corporation of New Jersey
Filed Apr. 18, 1963, Ser. No. 273,886
8 Claims. (Cl. 219—59)

This invention relates to the welding of seams along the walls of tubular members by the use of high frequency electrical heating current.

A method and apparatus for welding together the edges of a longitudinal gap in metal tubing by the use of high frequency electrical heating current, has come into extensive and successful use, and which involves applying the high frequency current by contacts to the opposite sides of the gap so that the current flows from such contacts to and from a weld point located subsequent to the contacts and where the gap edges are forced together in a forged welded relation by the use of so-called squeeze rollers located at opposite sides of the tubing and between which the tubing is rapidly advanced.

The present invention is more particularly directed to improvements for adapting methods and apparatus such as above referred to, to the problem of welding of such tubular members to the very ends of the desired welded seam line, that is, to the forward ends thereof as well as to the trailing ends. It will be appreciated that, before the forward ends of the gap edges in the workpiece to be welded approach the weld point where the gap edges become squeezed together, the path of the high frequency current, which normally should extend from the contacts along the gap edges to and from the weld point, will be incompleted until the forward end edges are actually squeezed together, and thus heating of such edges will not begin soon enough to start the weld at the forward end of the workpiece, unless some special expedient is used. Similarly, after the trailing ends of the gap edges have passed the contacts which apply the high frequency current thereto, the heating of such edges and the consequent welding thereof will be discontinued at a short distance from the end of the desired seam.

In accordance with the present invention, means and methods are provided for overcoming the above-noted problems by the provision of suitable attachments adapted to be removably applied within and upon the end portions of the tubular members to be welded, and in such form as to initiate the desired high frequency current path from the contacts to and from the weld point at the proper time to insure starting of the welded seam at the very forward end, and also for continuing the current path from the contacts after the trailing ends of the gap edges have passed the contacts and until such trailing ends are squeezed together in welded relation. Briefly stated, the attachments embodying the invention comprise suitable conductive members or tab portions for extending the gap edges both forwardly and rearwardly of the actual ends of the tubular member being welded, and these members are preferably suitably supported by removable, expansible plug or plug-like means, adapted to be received in the forward and rear ends of the tubular member, such plug-like means having the added function of controlling the width of the gap in the tube so that same will not tend to become closed prematurely and thereby short-circuit the desired current paths. In accordance with preferred examples of the invention, the plug or plug-like means is so constructed as to be expansible by the action of fluid-pressure means, whereby the plug means is retained by frictional engagement within the tubular member, but may be readily removed upon release of the pressure, and also the frictional engagement being such that, at the proper times, the pressure of the squeeze rollers for squeezing the gap edges together at the weld point, will be able readily to accomplish that result. It may also be possible to retain such plug-like means within the ends of the tubular members by mechanical means other than fluid pressure-operated means, for instance by the use of spring means or magnetic means.

Various further and more specific objects, features and advantages of the invention will appear from the description given below, taken in connection with the accompanying drawings, illustrating by way of example preferred forms of the invention.

Figure 6:
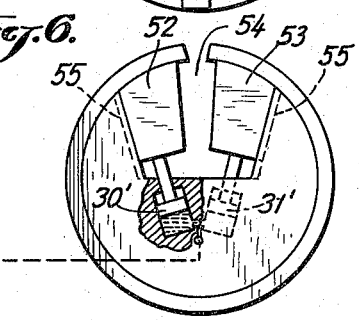
Figure 4:
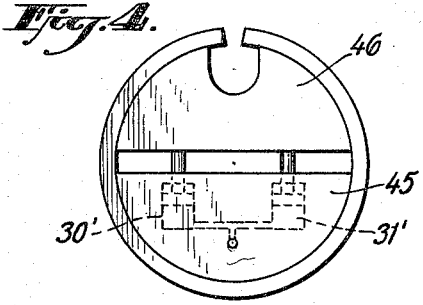
Figure 5:
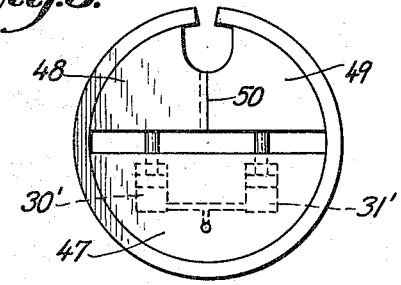

FIGS. 4–6 inclusive are similar end views of other and somewhat different embodiments;

FIG. 7 is a perspective view of still another embodiment showing the attachment means as applied to the trailing end of a tubular workpiece being welded;

FIG. 8 is a sectional view taken along a vertical plane through the axis of FIG. 7;

FIG. 9 is a somewhat schematic perspective view of an attachment embodying some of the features of construction of FIG. 7, but in a form adapted for application to the forward end portions of the tubular workpiece;

FIG. 10 is a view similar to FIG. 9, but showing another embodiment in which the attachment is adapted to be secured magnetically; and FIG. 11 is a sectional view taken along a vertical plane through the axis of the embodiment of FIG. 10.

Referring now to the drawings in further detail, a tubular member is indicated at 14, being advanced in the direction of the arrow by and between a pair of squeeze rollers as at 15, 16, which cause a longitudinal gap as at 17 in the tubing to become closed and welded as at a weld point w, to form a welded seam 17'. Current for heating the gap edges prior to the weld point and up to the desired welding temperature at the weld point, may be provided from a high frequency source, as indicated at 18, from which the current is applied, as by contacts 19 and 20, to opposite edges of the advancing gap 17. The current used may have a frequency of at least about 50,000 cycles per second, although usually higher frequencies up to 300,000 to 400,000 cycles per second or more, may be preferred. It will be understood that the contacts and the connections therefor as is the usual practice for such high frequency circuits, may be in the form of fluid-cooled conductive elements. However, with the parts in the positions as shown in FIG. 1, the trailing end edges of the gap 17 has already passed beyond the contacts 19 and 20, and thus in order to continue the current paths thereon and to continue the heating until the very end edges of the workpiece arrive at the weld point, or at least approximately at that point, metal tabs formed, for example, of high conductivity copper are provided, as indicated at 21 and 22, and against which the contacts 19, 20 will bear after the trailing end edges of the workpiece have passed the contacts.

As shown, the conductive tab portions 21 and 22 may be integrally formed with, or supported respectively by, bracket-like portions as at 23, 24, mounted upon or formed respectively as parts of generally sector-shaped plug portions 25 and 26, adapted to be lodged within the end of the tubular workpiece. Such plug-like means may be completed by another sector-shaped portion 27, the sides of which, as at 28 and 29, are hingedly connected to, or pivoted against, the portions 25, 26 respectively. Small fluid pressure-operated cylinder and piston elements may be provided as at 30, 31, these, as shown, being mounted in the portion 27 and having plungers which engage against the surfaces of members 25, 26 for thrusting same into firm frictional engagement with the inside surfaces of the tubular workpiece. These cylinder and piston elements may be in the form of small, refillable, self-contained air reservoir units, with suitable plungers so that the plug assembly 25, 26, 27 when inserted, may be firmly and frictionally engaged in place within the tubular workpiece by actuating the elements 30, 31.

Although, as the tubular member 14 advances, the squeeze rollers 15, 16 will tend to close the trailing end of the tube gap 17 before it reaches the weld point w, yet the engagement of the under sides of the gap edges with the plug portions 25 and 26, will serve frictional to retain the gap open, and thus not short-circuited, until the end edges thereof arrive substantially at the weld point, whereupon the effect of the squeeze rollers 15, 16 will overcome the effect of the frictional engagement of the plug means, permitting the end of the gap to become closed at the proper time. Meanwhile, the high frequency current will follow paths from the contacts 19 and 20 along the gap edges to and from the weld point, or, after the tabs 21, 22 come into play, the current paths will follow along the edges of such tabs part way, and then along the gap edges to and from the weld point, as shown by the dotted lines.

Figure 1:
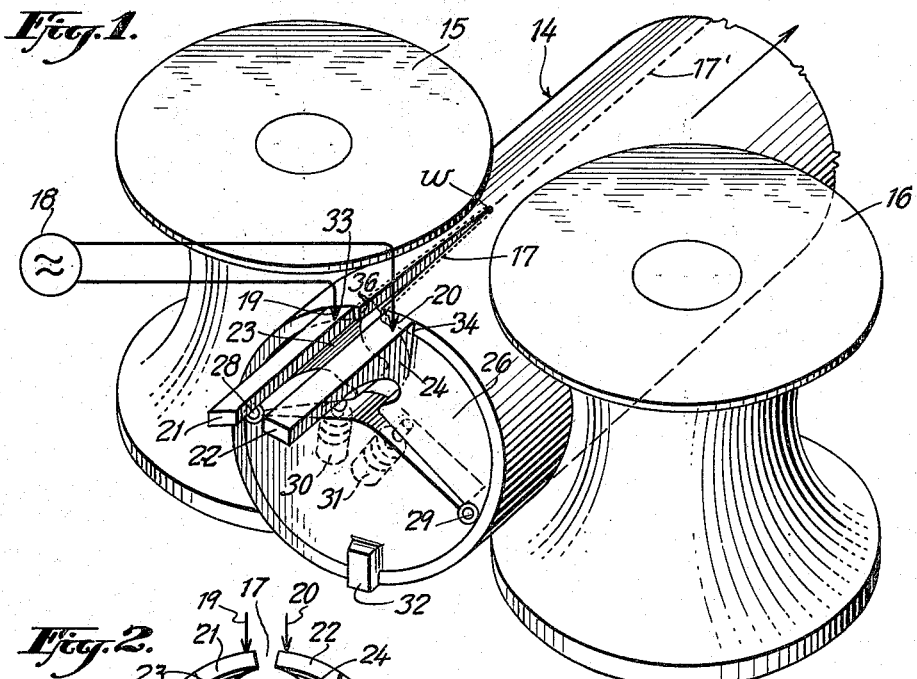
FIG. 1 is a perspective view showing a tubular member in the process of being welded along a longitudinal gap thereon during its passage past a weld point between squeeze rollers, this view showing somewhat schematically certain features of one embodiment of the invention as applied to the trailing end portions of the workpiece.
Figure 2:
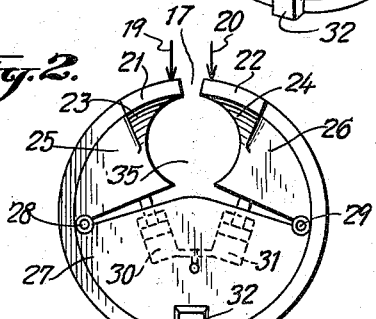
FIG. 2 is an end view of the embodiment shown in FIG. 1.

As indicated in FIGS. 1 and 2, the plug portion 27 may be provided with stop means as at 32 for preventing same from sliding too far inwardly of the tubular workpiece. Also, the tab portions 21, 22 may be so shaped, as indicated at 33, 34, as to engage the end edges of the tubular workpiece, thereby preventing plug portions 25, 26 from sliding too far inwardly of the tubing.

As best shown in FIG. 2, the plug portions 25, 26 may be so shaped as to provide therebetween an aperture as at 35, through which suitable scarfing means (not shown) for scarfing the interior of the welded seam, may be mounted upon a suitable bracket in accordance with prior known practice.

Preferably the tab means 21, 22 should be so shaped and positioned that their inner-facing edges are somewhat wider apart than the width of the trailing end of the gap 17, this difference in width being represented by the notches bearing the reference numerals 36 in FIG. 1. This will allow the metal along the seam line, when being welded, to become upset somewhat, without immediately allowing the facing edges of the tabs 21, 22 to come into contact with each other.

Figure 3:
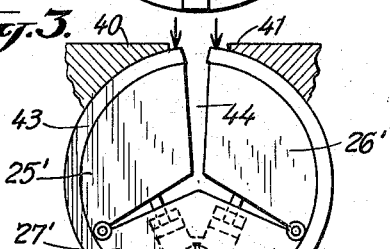
FIG. 3 is a similar end view of a somewhat different embodiment.

Since the attachment features forming the subject matter of the invention as shown in the embodiment of FIGS. 1 and 2, are all attachable and may later be detached from the ends of tubular workpieces, same may be repeatedly used, and it may be noted that the facing edges of the tab portions 21, 22 will not become welded together (which would prevent reuse thereof) for the reason that the end edges of the tube gap will become pressed together and welded just prior to or about the time that the contacts run off from the trailing ends of the tabs, thus discontinuing the heating circuit. Furthermore, the tabs 21, 22 being formed of high conductivity copper, will have such low resistance as to tend to not become heated quite to the welding point at their edges before the current is thus discontinued. It should be further noted that the attachments embodying the invention as above described, as well as the other forms of attachments hereinafter described, are all of dimensions such as to be located substantially within the outer diameter of the tubular workpieces with which they are to be used, and thus they will not interfere with the proper operation of the squeeze rollers, or other rollers or means in the tube mill, which are to engage the outer surfaces of the tubing. In fact, these attachments may be used in cases where, instead of having the tubing pass through a tube mill, lengths of tubular workpiece may be carried past the weld point in box-like die means, such as shown in the co-pending application of Jack Morris and Wallace C. Rudd, Serial No. 274,040 filed on even date herewith, and entitled "Welding of Tubular Members." As shown in that application, the tubular workpiece is contained within a cavity formed with a longitudinal opening to the cavity extending along the line of the tube gap, and such opening may have side edges such as indicated at 40, 41 in FIG. 3. This figure shows a vertical transverse sectional view of an end of a tubular workpiece 43, having a gap end 44, which is about to be welded. In this case, a plug means formed of portions 25', 26' and 27', generally similar to the parts 25, 26 and 27 above described, may be provided.

FIG. 4 shows possible variations in the form of the plug means, that is, same may be comprised of two parts, for example, as indicated at 45, 46, actuated by fluid-pressure cylinder and piston elements as at 30', 31'. With the form shown in FIG. 5, the plug means may comprise three parts as at 47, 48, 49, the latter being associated by a slidable tongue-in-groove joint as at 50. With the form shown in FIG. 6, the larger part of the plug means may be comprised of a member 51 accompanied by two smaller members as at 52, 53, slidable within a recess 54 in member 51, the slidable engagement being along tongue-in-groove joints as at 55.

With the form of the invention shown in FIG. 7, a tubular workpiece 60 is being advanced in the direction shown by the arrow thereon and with the trailing end edges of a gap 61 therein just leaving a pair of contacts as at 62, 63, which, as here shown, have slid onto a pair of tabs or bars 64, 65 respectively, formed of high conductivity material such as copper, and having a gap 66 therebetween. This gap is normally slightly wider than the normal width of the gap 61 at the trailing end edges thereof prior to the moment when the latter reach the weld point. The inner ends of the bars 64, 65 may be secured to a suitable member of insulation material 67. The outer ends may be interconnected as by an insulation piece 68. The member 67 may contain a suitable cylinder and piston or hydraulically-operated element 69, the plunger 70 of which is connected to a shoe 71, engaging the bottom interior surface of the tubular workpiece. Thus, when the assembly is put into place as shown and the hydraulic element 69 is actuated, the assembly will be frictionally engaged within the tubular workpiece in the manner shown in FIG. 7, and until the trailing end portions of the tubing approach the weld point w, whereupon by the action of squeeze rollers such as indicated at 15 and 16 in FIG. 1, or by other suitable means, the trailing end of the gap will become closed at the proper moment, with the gap edges frictionally sliding to closed position with respect to the portions of the attachment above described, which come into engagement therewith.

As contrasted with the arrangements of FIGS. 7 and 8 which concern attachment means for controlling the tube gap and current paths at the trailing end of the workpiece, there is shown in FIG. 9, a somewhat similar attachment means for meeting the problems which occur at the forward end of the tubular workpiece. That is, as shown in FIG. 9, a tubular workpiece as at 75 is shown as being advanced in the direction of the arrow (in the direction opposite from the advance of the tubing as shown in FIG. 7). Here the edges of the open tube gap 76 have not as yet quite reached the high frequency current contacts 77 and 78. A moment later, however, the tube gap edges will have become pressed together at a weld point such as indicated in FIG. 9 at w. Suitable size squeeze rollers as shown in FIG. 1 or other means for closing the gap (such as disclosed in the above mentioned Morris-Rudd application) are for clearness not shown in FIG. 9. With the embodiment of this figure, a U-shaped high conductivity member as at 80 is provided having side bar portions as at 81, 82 and along which, with the parts in the positions as here shown, current paths are provided, as indicated by the dotted lines 83, from the contacts 77, 78 substantially to and from the weld point *w*. It will be noted that the member 80, with its side bar portions 81 and 82, may be supported within the advancing end of the tubing as by an insulation member 67', a shoe member 71', and by the use of hydraulic or other fluid pressure-operated piston means such as indicated at 69', 70', these several parts being like those shown in FIGS. 7 and 8 and there identified by the same numerals, except with prime marks.

It will be understood that, as the forward end of the tube 75 as shown in FIG. 9, continues to advance, the contacts 77, 78 will slide along the edges of the gap 76 respectively, thus causing such edges rather rapidly to be heated up to welding temperature by the time they arrive at the desired weld point, such as indicated at *w*, whereupon the apparatus will continue to operate to continue the welding of the seam in accordance with known practice until the trailing end portion reaches the weld point and becomes welded by aid of attachments such as hereinabove described in connection with FIGS. 1–8.

With the embodiment shown in FIGS. 10 and 11, various of the parts are the same as those shown in FIG. 9, and are identified by the same reference characters accompanied by prime marks. However, here the attachment is secured in place by the use of a magnet, as indicated at 90, either in the form of a permanent magnet or an electromagnet. The ends of the conductive bars 81', 82' may be secured to the poles of the magnet as by screws 91 and preferably with an insulation piece as at 92 intervening between the magnet pole pieces and the conductive members.

Although certain particular embodiments of the invention are herein disclosed for purposes of explanation, further modifications thereof, after study of this specification, will be apparent to those skilled in the art to which the invention pertains. For example, while the various embodiments of the invention are disclosed above wherein the high frequency current is applied to the gap edges by the use of contacts, yet in some cases it may be found preferable to apply the high frequency current to such edges inductively by means which per se are well known. Reference should accordingly be had to the appended claims in determining the scope of the invention.

What is claimed and desired to be secured by Letters Patent is:

1. In apparatus for welding together the edges of a longitudinal gap in a tubular metal member, the apparatus having a pair of means between which the member is advanced while the gap in V-shaped form becomes closed at its apex at a weld point by the action of said means, means being provided to cause high frequency current to flow along on the opposite edges of the gap in advance of the weld point for heating the gap edges to welding temperature at the weld point; said apparatus being characterized by the provision of attachment means adapted to be carried at and within an end of the tubular member and comprising a pair of conductive portions adapted to be positioned to engage the ends of said gap edges at said end of the tubular member and to provide conductive means forming paths for said current for effectively extending said paths respectively beyond said end of said tubing, and means removably insertable within said end of the tubing and attached to and supporting said conductive portions for carrying same while the tubing is advanced through the welding apparatus, said latter means including means for causing same frictionally to engage on opposite sides of the gap the interior surfaces of the tubular member and to retain the gap open adjacent the end of the tubular member until closed at the weld point by said first-named means.

2. In apparatus for welding together the edges of a longitudinal gap in a tubular metal member, the apparatus having a pair of means between which the member is advanced while the gap in V-shaped form becomes closed at its apex at a weld point by the action of said means, contacts being provided to engage at opposite sides of the gap in advance of the weld point for conducting high frequency current from the contacts to and from the weld point; said apparatus being characterized by the provision of attachment means adapted to be carried at and within an end of the tubular member and comprising a pair of conductive portions adapted to be positioned to engage the ends of the edges of said gap respectively at said end of the tubular member and to provide conductive means engageable by said contacts for effectively extending the current paths at said end edges respectively beyond the end of said tubing, and means removably insertable within said end of the tubing and attached to and supporting said conductive portions for carrying same while the tubing is advanced through the welding apparatus, said latter means including means for causing same frictionally to engage on opposite sides of the gap the interior surfaces of the tubular member and to retain the gap open adjacent the end of the tubular member until closed at the weld point by said first-named means.

3. In apparatus for welding together the edges of a longitudinal gap in a tubular metal member, the apparatus having a pair of means between which the member is advanced while the gap in V-shaped form becomes closed at its apex at a weld point by the action of said means, means being provided to cause high frequency current to flow along on the opposite edges of the gap in advance of the weld point for heating the gap edges to welding temperature at the weld point; said apparatus being characterized by the provision of attachment means adapted to be carried at and within the trailing end of the tubular member and comprising a pair of conductive portions adapted to be positioned to engage the ends of said gap edges at said end of the tubular member and to provide conductive means for effectively extending the paths for said current beyond the trailing end of said tubing to permit heating and welding the gap edges substantially to the trailing end of the member, and means removably insertable within said end of the tubing for supporting and carrying said conductive portions while the tubing is advanced through the welding apparatus, said latter means including means for effectively expanding same to frictionally engage interior surfaces of the tubular member on opposite sides of the gap to retain the gap open at its trailing end substantially until closed at the weld point by said first-named means.

4. In apparatus for welding together the edges of a longitudinal gap in a tubular metal member, the apparatus having a pair of means between which the member is advanced while the gap in V-shaped form becomes closed at its apex at a weld point by the action of said means, means being provided to cause high frequency current to flow along on the opposite edges of the gap in advance of the weld point for heating the gap edges to welding temperature at the weld point; said apparatus being characterized by the provision of attachment means adapted to be carried at and within the forward end of the tubular member and comprising a pair of conductive portions adapted to be positioned to engage the ends of said gap edges at said end of the tubular member, said portions being interconnected at a point substantially in advance of the forward end of the tubular member to provide conductive means for effectively extending the paths for said current beyond said forward end, to permit heating and welding of the gap edges substantially to the forward end of the member and means removably insertable within said end of the tubing for supporting and carrying said metal portions while the tubing is advanced through the welding apparatus said latter means including means to expand same into frictional engagement with the interior surfaces of the tubular member.

5. Apparatus in accordance with the foregoing claim 1 and in which said removable insertable means includes a plurality of parts each adapted to engage interior wall surfaces of the tubular member, and fluid pressure-operated means for relatively moving said parts into and out of such engagement.

6. Apparatus in accordance with the foregoing claim 1 and in which said removable insertable means comprises plug-like means embodying a plurality of sector-like portions and fluid pressure-operated means positioned to engage said sector-like portions relatively to separate same and thus to expand the plug-like means into yieldable engagement with the interior surfaces of the tubular member, thereby to hold the gap at regions adjacent the end of the tubular member in open condition until closed at the weld point.

7. In apparatus for welding together the edges of a longitudinal gap in a tubular metal member: a pair of tab-like conductive members constructed and positioned to extend longitudinally beyond an end of the tubular member at opposite sides of the gap for effectively extending current paths along said gap edges; and plug-like means insertable within said end of the tubular member for supporting and carrying said tab-like conductive members while the tubing is advanced through welding apparatus, said latter means including fluid pressure-operated means for effectively expanding same into engagement with the interior surfaces of the tubular member for retaining same in position.

8. In apparatus for welding together the edges of a longitudinal gap in a tubular member: a pair of conductive members constructed and positioned to extend longitudinally beyond the end of the tubular member at opposite sides of the gap for effectively extending current paths along said gap edges; and means insertable within said end of the tubular member for supporting and carrying said conductive members while the tubular member is advanced through welding apparatus, said latter means including an insulation portion supporting said conductive members in position for engaging interior surfaces of the tubular member at opposite sides of the gap for frictionally retaining such gap in open condition until pressure is applied to close same at a weld point and shoe means for engaging the interior surface of the tubular member opposite the gap, and fluid pressure-operable expansible means between said insulation portion and shoe means for forcing same apart into operative positions within the tubular member.

References Cited by the Examiner

UNITED STATES PATENTS 3,015,017  12/61  Rudd _____ 219—65

FOREIGN PATENTS 551,180  5/32  Germany.

RICHARD M. WOOD, *Primary Examiner.*